March 20, 1962     L. B. CONNER, JR     3,026,476
OPTICAL GALVANOMETER MULTIPLIER USING PULSE WIDTH MODULATION
Filed June 30, 1958

INVENTOR.
Leo B. Conner, Jr.
BY
ATTORNEY

United States Patent Office 3,026,476
Patented Mar. 20, 1962

3,026,476
OPTICAL GALVANOMETER MULTIPLIER USING PULSE WIDTH MODULATION
Leo B. Conner, Jr., Flint, Mich., assignor to General Motors Corporation, Detroit, Mich., a corporation of Delaware
Filed June 30, 1958, Ser. No. 745,761
3 Claims. (Cl. 324—97)

This invention relates to multiplying and more specifically for means for multiplying a plurality of variable electrical signals together and for continuously indicating the momentary product. There are many instances in measuring or calculating equipment in which it is necessary to multiply a plurality of signals together which represent differing conditions, characteristics, distances or values to provide a composite product signal or reading.

It is therefore an object in making this invention to provide a simple and efficient device for multiplying a plurality of variable electrical signals.

It is a further object in making this invention to provide an electric signal multiplying device that indicates instantaneous values of the product.

It is a still further object in making this invention to provide an optical galvanometer signal multiplier.

With these and other objects in view which will become obvious as the specification proceeds, my invention will be best understood by reference to the following specification and claims, together with the illustrations in the associated drawings in which:

Figure 1:
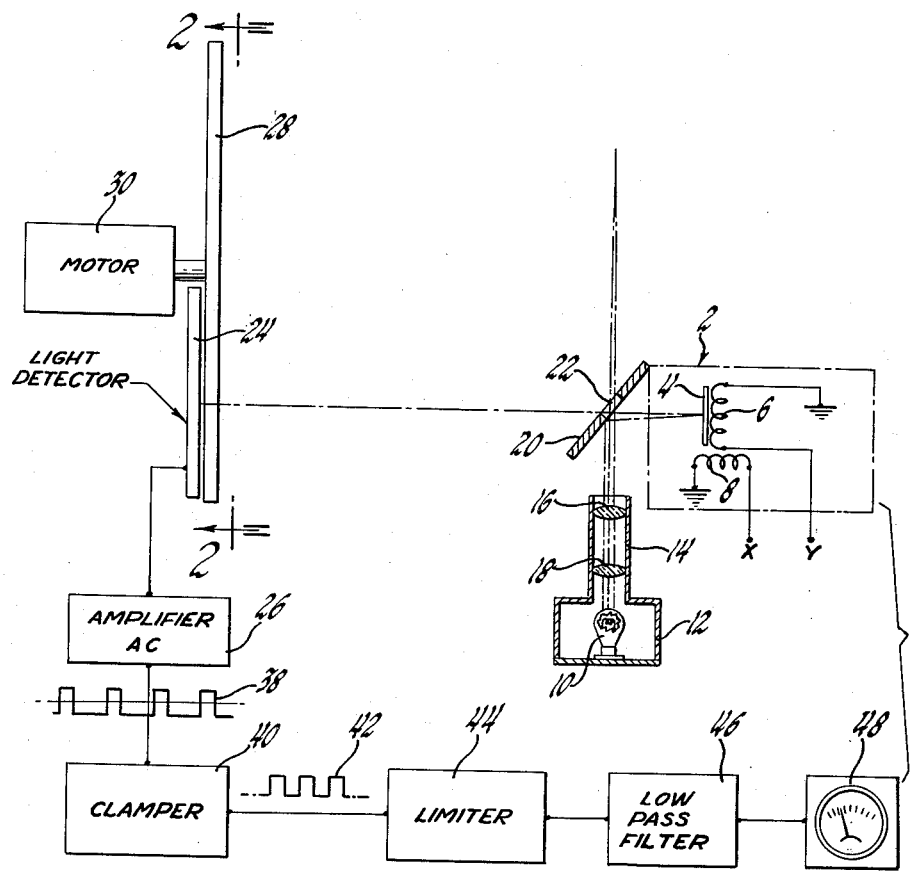
FIGURE 1 is a combination schematic and block diagram of the signal multiplying means embodying my invention.

Referring now more specifically to the drawings, there is shown therein a galvanometer measuring device shown generally at 2 and which includes a movable coil 6 and a fixed coil 8. A mirror 4 is mounted upon the movable coil for movement therewith to an angular position corresponding to the product of the currents in the respective coils. The two signals to be multiplied are independently applied to the coils to displace the pivoted mirror. One terminal of each of the coils 6 and 8 is grounded. One of the two signals to be multiplied is applied to terminal X of coil 8 and the other variable signal is applied to terminal Y of coil 6. A source of illumination 10 is enclosed in a light-tight housing 12 and projects rays through an elongated collimating tube section 14 which includes a pair of lenses 16 and 18. From the upper end of the enclosure a cylindrical column of light is projected which impinges on one surface of a beam splitting member 20 and is reflected therefrom to the pivotally mounted mirror 4. The beam splitting member 20 includes a reflective-transmitting portion 22 through which light reflected from the mirror may pass to a light sensitive pickup.

Figure 2:
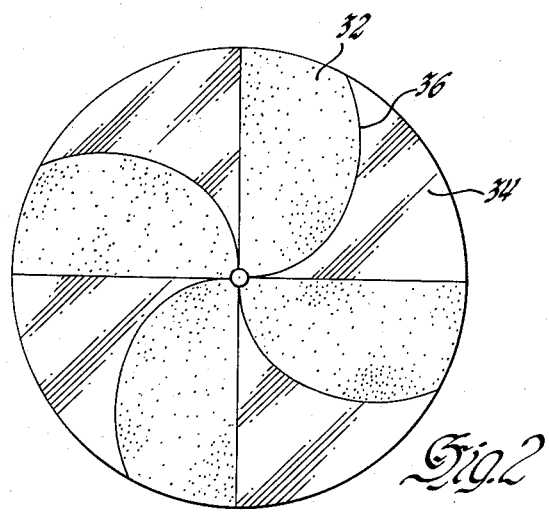
FIGURE 2 is a front view of the modulator disk used therein taken on line 2—2 of FIGURE 1.
Figure 3:
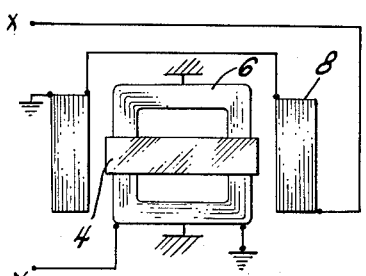
FIGURE 3 shows further details of the galvanometer.

The pickup portion includes an elongated light detector 24 mounted in axial alignment with the movement of the light beam reflected from the mirror 4 of the galvanometer. As the mirror rotates about its axis, the beam of light passing through the portion 22 in the beam splitter 20 will move along the axis of the light detector 24. The light detector is electrically connected to a conventional A.C. amplifier 26 where the signal developed is amplified. A modulating disk 28 is mounted to rotate in front of the light detector 24 and is driven by a suitable motor 30. The light modulating disk is best shown in FIGURE 2 which is a front view. It includes a plurality of opaque and transparent sections which modulate the light beam from the mirror 4 to the light detector 24.

The opaque sections are shown at 32 and the transparent sections at 34. The curved line 36 between the sections 32 and 34 in any one quadrant provides a circumferential length through the transparent section which varies as the square of the radius in order to produce the desired result. In other words, the sections 32 and 34 have configurations such that any arc concentric with the axis of rotation of the disc 28 has a circumferential length in each transparent section which varies as the square of the radius of the arc.

As the mirror 4 pivots and causes the light beam to move radially outward along the detector 24, wider and wider pulses will be generated thereby and applied to the A.C. amplifier since the detector will receive light for longer periods. This signal is proportional to the product of the two voltages applied to terminals X and Y because of the combined effect of the two coils 6 and 8 on said mirror. The output of the A.C. amplifier 26 is therefore a series of square waves diagrammatically shown at 38 whose width depends upon the radial position of the reflected beam from the pivoted mirror 4. The larger the deflection and the farther out the beam strikes the light detector 24, the wider will be the square waves 38.

The output of the A.C. amplifier 26 is then fed into a clamper 40 which is a conventional device which holds the base of the square waves at a desired reference potential. The square waves such as 42 shown in the output of this device are now positive with reference to ground and are then applied to a limiter 44 to limit the pulses to a constant amplitude. The pulses are then passed through a low pass filter 46 to develop an output voltage which is directly proportional only to the width of the square waves applied to the filter. This D.C. voltage is therefore a direct reading of the product of the two signal voltages applied to X and Y. This output can be applied directly to any type of D.C. voltage measuring means such as a voltmeter 48 and may be calibrated directly in units showing the product of the applied signals.

I claim:

1. In measuring means, a galvanometer including a pivotally mounted mirror and a plurality of actuating coils to which operating voltages may be independently applied, said mirror taking a position depending upon the composite field generated by the coils, a light sensitive member disposed in alignment with the path of a beam from the mirror as it moves pivotally, a source of light mounted to project a beam on said mirror for reflection to the light sensitive member, a light modulating means mounted between said mirror and light sensitive member and having variable width transparent and opaque areas, means for moving said modulating means to provide pulses in the light sensitive means, said modulating means being so mounted that the width of the transparent areas upon which the light beam from the mirror impinges varies for different mirror positions, amplifying means connected to the light sensitive means to amplify the output, clamping means connected to the output of the amplifying means to hold the base of the pulses to a desired reference potential, and means connected to the output of the clamping means for developing a signal corresponding to the time average value of the pulses.

2. In measuring means, a galvanometer including a source of light, a mirror upon which a light beam from said source falls and a plurality of actuating coils for said mirror to which independent variable signals may be fed, an elongated light sensitive member mounted adjacent said galvanometer over which a reflected beam from the mirror may move as the mirror rotates, movable modulating means having variable width opaque and transparent areas mounted between the mirror and light sensitive member so that the width of the areas will change as the beam from the mirror moves axially over the light sensitive member, driving means for moving the movable modulating means to produce pulses in said light sensitive member when a beam of light is projected thereon from the mirror, means connected to the light sensitive member to convert the pulses to a direct current voltage whose value is dependent on pulse width, and utilization means connected to the last named means and responsive to the output.

3. In measuring means, galvanometer means including a reflective mirror whose position is determined by resultant magnetic forces and which projects a beam of light to points along a defined path, an elongated light sensitive member mounted on said path to receive said beam, movable modulating means mounted between said mirror and said light sensitive member to chop the beam and produce pulses in the output of the light sensitive member, said modulating means having transparent sections which increase in area along the length of the light sensitive member so that the pulses generated by the light sensitive member vary in width depending upon the axial position of the impinging beams, means connected to the light sensitive member to convert said pulses into a direct current voltage and indicating means connected to said last named means to indicate the value of the direct current voltage which will change as the pulse width changes to indicate the position of the galvanometer.

References Cited in the file of this patent

UNITED STATES PATENTS

| | | |
|---|---|---|
| 1,746,661 | Legg | Feb. 11, 1930 |
| 2,102,145 | Fallou | Dec. 14, 1937 |
| 2,410,379 | Hathaway | Oct. 29, 1946 |
| 2,497,042 | Doll | Feb. 7, 1950 |
| 2,507,301 | Fulbright | May 9, 1950 |
| 2,604,528 | Obermaier | July 22, 1952 |
| 2,704,827 | Millar et al. | Mar. 22, 1955 |
| 2,859,915 | Doll | Nov. 11, 1958 |